US011933913B2

(12) United States Patent
Nishimura

(10) Patent No.: US 11,933,913 B2
(45) Date of Patent: Mar. 19, 2024

(54) IMPLEMENTING NON-POINT TARGETS USING DIRECT SYNTHESIS OF RADAR SIGNALS

(71) Applicant: Keysight Technologies, Inc., Santa Rosa, CA (US)

(72) Inventor: Ken A. Nishimura, Fremont, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 633 days.

(21) Appl. No.: 17/034,638

(22) Filed: Sep. 28, 2020

(65) Prior Publication Data

US 2021/0132190 A1 May 6, 2021

Related U.S. Application Data

(60) Provisional application No. 62/928,404, filed on Oct. 31, 2019.

(51) Int. Cl.
*G01S 7/40* (2006.01)

(52) U.S. Cl.
CPC .............. *G01S 7/4056* (2013.01); *G01S 7/40* (2013.01); *G01S 7/4095* (2021.05)

(58) Field of Classification Search
CPC ........ G01S 7/4056; G01S 7/40; G01S 7/4095; G01S 13/931; G01S 7/4086

(Continued)

(56) References Cited

U.S. PATENT DOCUMENTS 6,563,451 B1 * 5/2003 Krikorian ............... G01S 13/89 342/25 R
9,575,161 B1 2/2017 Haghighi et al.

(Continued)

FOREIGN PATENT DOCUMENTS

CN 102073035 A 5/2011
CN 104360331 A 2/2015

(Continued)

OTHER PUBLICATIONS

English translation of CN102073035A, 11 pgs.

(Continued)

*Primary Examiner* — Peter M Bythrow
*Assistant Examiner* — Nazra Nur Waheed

(57) ABSTRACT

A method of emulating echo signals reflected from an elongated target during radar testing includes identifying first and second end points do the target; acquiring a radar signal from a radar sensor that includes multiple receive elements; generating emulated echo signals, responsive to the acquired radar signal, corresponding to target points on the target, including the first and second end points and reference points located on a line connecting the first and second end points, by repeatedly identifying descriptive attributes corresponding to each of the target points during an integration period of the radar sensor, where the descriptive attributes are identified by interpolating between the corresponding descriptive attributes of the first and second end points; and applying the emulated echo signals to the receive elements of the radar sensor, respectively, during the integration period, where radar sensor calculates a relative position of the target using the descriptive attributes.

10 Claims, 8 Drawing Sheets

520 600 610 D C B 501 A 502
$r_A, \theta_A$ $r_B, \theta_B$ $r_C \theta_C$ $r_D, \theta_D$ $r_1, \theta_1$ $r_2, \theta_2$
Antenna Spacing: $D_{RX}$ $Rx_1$ $Rx_2$ $Rx_3$ $Rx_4$

(58) Field of Classification Search
USPC .......................................................... 342/172
See application file for complete search history.

(56) References Cited

U.S. PATENT DOCUMENTS

| | | | | |
|---|---|---|---|---|
| 10,133,834 | B2 * | 11/2018 | Pechberti ................ | G06F 30/20 |
| 2017/0307732 | A1 * | 10/2017 | Haghighi ............. | G01S 7/4056 |

FOREIGN PATENT DOCUMENTS

| | | | | | |
|---|---|---|---|---|---|
| CN | 104459666 | A | * | 3/2015 | ........... G01S 7/4052 |
| CN | 104597430 | A | | 5/2015 | |
| CN | 106707254 | A | | 5/2017 | |
| DE | 102013018752 | A1 | | 5/2015 | |
| DE | 102013018752 | A1 | | 9/2019 | |
| GB | 2198246 | A | * | 6/1988 | ............. G01R 23/16 |

OTHER PUBLICATIONS

English translation CN104360331A, 11 pgs.
English translation CN104597430A, 11 pgs.
English translation CN106707254A, 20 pgs.

* cited by examiner

IMPLEMENTING NON-POINT TARGETS USING DIRECT SYNTHESIS OF RADAR SIGNALS

CROSS-REFERENCE TO RELATED APPLICATIONS

This present application is claims priority under 35 U.S.C. § 119(e) from U.S. Provisional Application 62/928,404 filed on Oct. 31, 2019, which names Ken A. Nishimura, et al. as inventors. The entire disclosure of U.S. Provisional Application 62/928,404 is specifically incorporated herein by reference.

BACKGROUND

Millimeter wave (mmWave) automotive radar is a key technology for advanced driver-assistance systems (ADASs) and for planned autonomous driving systems. Millimeter waves result from oscillations at frequencies in the frequency spectrum between 30 gigahertz (GHz) and 300 GHz. For example, millimeter wave automotive radar is used in ADAS to warn of forward collisions and backward collisions, to implement adaptive cruise control and autonomous parking, and ultimately to perform autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that mmWave automotive radar can now be deployed in large volumes. Thus, mmWave automotive radar is now widely used for long range, middle range and short range environment sensing in ADAS. Additionally, millimeter wave automotive radar systems are likely to be widely used in autonomous driving systems currently being developed.

Conventional automotive mmWave radar systems typically have multiple radio frequency (RF) transmitters and multiple RF receivers, where the RF transmitters may be used either to improve spatial resolution of the radar or to achieve transmitter beam sweeping. Actual driving environments in which automotive radars may be deployed can vary greatly and many such driving environments may be complex. For example, actual driving environments may contain numerous objects, and some objects encountered in actual driving environments have complicated reflection, diffraction and multi-time reflection characteristics that affect echo signals. The immediate consequences of incorrectly sensing and/or interpreting echo signals may be that false warnings or improper reactions are triggered or warnings or reactions that should be triggered are not, which in turn can lead to collisions.

In recent years, companies testing autonomous vehicles in actual driving environments have reported a series of accidents, showing the importance of thorough testing for automotive radar and the on-vehicle driving controllers. To avoid such accidents, automotive radars may be tested in various driving scenarios. A testing environment for automotive radars may include a radar target emulator (or scenario emulator) which emulates echo signals from multiple targets (multi-target echo signals) to the different radar sensors on a vehicle under the driving scenarios. The different radar sensors are tested using the emulated echo signals. However, use of scenario emulators has imposed challenges in designing test solutions.

For example, many radar target emulators serve to emulate one or more point sources corresponding to emulated targets (point targets). To the extent a target is emulated using digital radio frequency memory (DRFM), the target geometry is dictated by the geometry of an RF aperture performing the input/output function of the DRFM. In typical far-field emulation environments, the size of the RF aperture is usually much smaller than the range distance between the sensor and the emulated target, thereby approximating the point targets. Point target emulation may be adequate for some applications, particularly where the applications operate at a long range, in which case a point target approximation may adequately simulate the actual situation.

However, objects at close ranges, elongated objects, areal objects, linear objects, and large objects at measurable distances (collectively referred to as "non-point targets"), cannot be accurately represented by as a point target. Conventionally, such objects are represented by a series of individual points (e.g., a wireframe model) or by a target that has a finite two-dimensional (2D) representation. Emulating a finite 2D target in the far-field is difficult because the RF apertures that correctly represent a large target size may be large and unwieldy. In addition, objects having vertical dimensions are represented as targets only in a horizontal plane, which limits emulation that accurately corresponds to the shape of the target in multiple dimensions. Therefore, what is needed is a more efficient means to emulate non-point targets, for example, in both horizontal and vertical dimensions.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
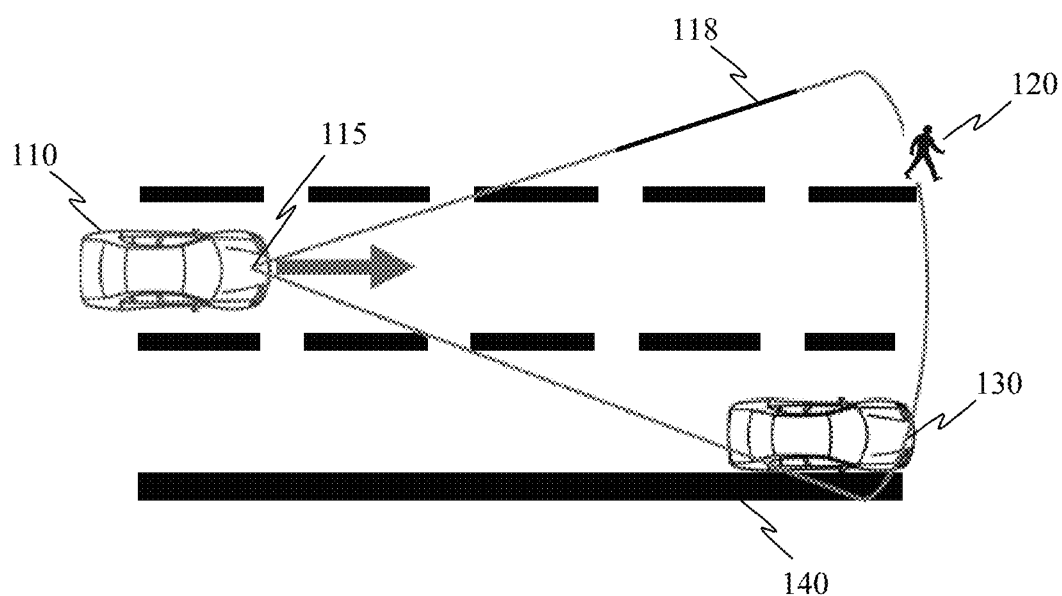
FIG. 1 is a plan view of an automotive radar sensor illuminating multiple targets.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, 2D non-point targets are emulated in the horizontal (azimuthal) dimension and the vertical (elevation) dimension during automotive radar testing. A non-point target is any radar target that is not effectively or adequately represented by a single point, such as generally elongated objects, lines, and areal objects, for example.

FIG. 1 is a plan view of an automotive radar sensor illuminating multiple targets. Referring to FIG. 1, an automobile 110 includes a radar sensor 115 that transmits radar signals (e.g., mmWave RF signals having frequencies in a range of about 76 GHz to about 77 GHz) in a forward direction relative to movement of the automobile 110. Within a field of view 118 of the radar sensor 115 are representative targets, including a pedestrian 120, a stationary automobile 130, and a guard rail 140. The pedestrian 120 is small enough, and at a great enough distance from the radar sensor 115 that it is adequately represented by a point for purposes of ADAS. In other words, the pedestrian 120 may be represented as a point target in radar testing. The stationary automobile 130 likewise may be adequately represented as a point target at a great enough distance from the radar sensor 115, although at closer distances, the stationary automobile 130 is better represented by multiple points corresponding to the dimension facing the automobile 110. In other words, the stationary automobile 130 may be represented as a non-point target under certain circumstances. The guard rail 140, due to its inherent elongated shape, will always be best represented as a non-point target.

In addition, the representative targets have horizontal and vertical aspects to their respective shapes. For example, the guard rail 140 may be adequately represented as an emulated target by a horizontally oriented line. The pedestrian 120 and the stationary automobile 130, though, if close enough to the automobile 110 to warrant representation by non-point targets, include vertical aspects that should be included in the emulated targets as well.

Figure 2:
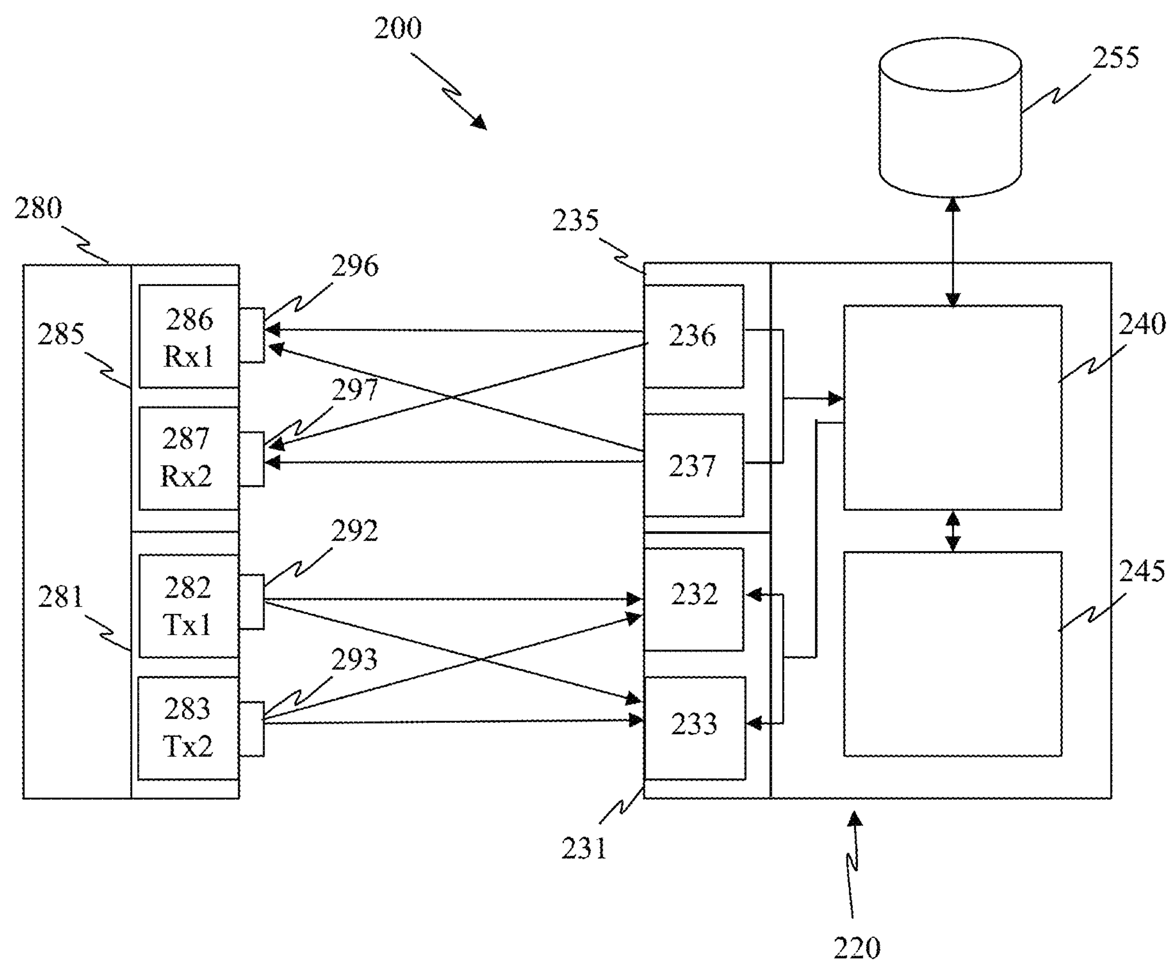
FIG. 2 is a simplified block diagram showing a radar target emulation system for emulating non-point targets for testing a radar sensor, according to a representative embodiment.

FIG. 2 is a simplified block diagram showing an illustrative radar target emulation system for emulating non-point targets for testing a radar sensor, according to a representative embodiment.

Referring to FIG. 2, a radar target emulation system 200 acquires radar signals from a mmWave radar sensor 280, which is the radar device under test (DUT) in the depicted configuration, and applies emulated echo signals to the radar sensor 280 in response, in order to perform testing and/or calibration of the radar sensor 280, for example. The radar sensor 280 is configured or otherwise designed to be mounted to an automobile (e.g., automobile 110) to transmit radar signals for an ADAS. Generally, the radar target emulation system 200 may perform radar target emulation using direct synthesis, which refers to the process of calculating the theoretical return signal (echo signal) as seen by each element of a radar receiver in the radar sensor as a function of each target being emulated. Generally, this is done by taking the transmit signal from each transmit element of the radar sensor, and applying a transfer function representing the propagation path from the transmit element to the target and returning to each receive element, accounting for relative target reflectivity and velocity. Multiple targets may be handled by superposition, discussed below.

For purposes of illustration, the radar sensor 280 includes a transmitter 281 with two representative transmit (Tx) channels, indicated by first transmit channel 282 and second transmit channel 283, and a receiver 285 with two representative receive (Rx) channels, indicated by first receive channel 286 and second receive channel 287. The first and second transmit channels 282 and 283 are respectively connected to transmit antenna elements of a radar transmit antenna, indicated by representative first transmit antenna element 292 and second transmit antenna element 293 for sending radar signals to the radar target emulation system 200. The first and second receive channels 286 and 287 are respectively connected to receive antenna elements of a radar receive antenna, indicated by representative first receive antenna element 296 and second receive antenna element 297, for receiving emulated echo signals from the radar target emulation system 200. One or both of the radar transmit and receive antennas may be a phased array antenna, for example. Of course, the radar sensor 280 may be have different numbers and arrangements of transmit and receive channels and/or transmit and receive antenna elements without departing from the scope of the present teachings. Notably, the present teachings contemplate not only the use of multiple transmitters and multiple receiver. However, the present teachings also contemplate a system in which there is only one transmitter, and multiple receivers.

In the depicted embodiment, the radar target emulation system 200 includes a target emulator 220 and a database 255, where the target emulator 220 includes a transmitter 235, a receiver 231, a processing unit 240, and a memory 245. The receiver 231 has two representative receive channels, indicated by first emulator receive channel 232 and second emulator receive channel 233. The first and second emulators receive channels 232 and 233 acquire the radar signals sent by the first and second transmit channels 282 and 283. The radar signals may be acquired by a wireless or wired connection to perform the test simulation. For a wireless connection, for example, the radar signals sent from the radar sensor 280 may be RF signals transmitted over the air via the first and second transmit antenna elements 292 and 293. In this case, the first and second emulator receive channels 232 and 233 receive the RF signals via a emulator receive antenna, such as a receive probe antenna array (not shown), and downconvert the RF signals to intermediate frequency (IF) signals, and digitize the IF signals for processing by the processing unit 240, as discussed below. For example, each of the first and second emulator receive channels 232 and 233 may include a downcoverter and an analog to digital converter (ADC). An example of a wireless connection between a radar sensor and a radar target emulation system is described in Chinese Patent Application No. 201910769553.6 to Hongwei Kong, filed Aug. 20, 2019 (attached), which is incorporated herein by reference in its entirety. For a wired connection, the radar signals sent from the radar sensor 280 may be IF signals sent over physical electrical connectors between each of the first and second transmit channels 282 and 283 and each of the first and second emulator receive channels 232 and 233. In this case, the first and second emulator receive channels 232 and 233 receive the IF signals directly (bypassing the radar transmit antenna and the emulator receive antenna), and digitize the received IF signals, without having to perform downconversion, for processing by the processing unit 240. Of course, other techniques for providing the radar signals from the radar sensor 280 to the target emulator 220 may be incorporated, without departing from the scope of the present teachings. It is further noted that a wired connection could also be at RF frequencies. As such, the same downconverter operation is needed as in the wireless embodiment.

Similarly, the transmitter 235 has two representative transmit channels, indicated by first emulator transmit channel 236 and second emulator transmit channel 237. The first and second emulator transmit channels 236 and 237 send out emulated echo signals provided by the processing unit 240, in response to the received radar signals, to the first and second receive channels 286 and 287 of the radar sensor 280. Again, the emulated echo signals may be sent by a wireless or wired connection. For a wireless connection, for example, the emulated echo signals may be RF signals transmitted over the air via an emulator transmit antenna, such as a transmit probe antenna array (not shown), to the first and second receive antenna elements 296 and 297 of the radar sensor 280. In this case, the first and second emulator transmit channels 236 and 237 acquire digital emulation data determined by the processing unit 240, as discussed below, convert the emulation data to analog at an IF, and upconvert the analog emulation data to RF signals that are sent to the radar sensor 280 via the emulator transmit antenna. For example, each of the first and second emulator transmit channels 236 and 237 may include a digital to analog converter (DAC) and an upconverter. For a wired connection, the emulated echo signals sent from the radar target emulation system 200 may be IF signals sent over physical electrical connectors between each of the first and second emulator transmit channels 236 and 237 and each of the first and second receive channels 282 and 283 of the radar sensor 280. In this case, the first and second emulator transmit channels 236 and 237 transmit the IF signals directly (bypassing the emulator transmit antenna and the radar receive antenna), such that the first and second receive channels 286 and 287 do not perform downconversion. Of course, other techniques for providing the emulated echo signals from the target emulator 220 to the radar sensor 280 may be incorporated, without departing from the scope of the present teachings. It is again noted that a wired connection could also be at RF frequencies. As such, the same downconverter operation is needed as in the wireless embodiment.

The processing unit 240, together with the memory 245, implements the methods of testing automotive radar described herein, including efficiently emulating radar targets in the azimuth and/or elevation directions, sending emulated echo signals from the transmitter 231 in response to the radar signals received by the receiver 235. The database 155 is representative of one or more memories and databases for storing data used for the radar target emulation. Such data may include antenna patterns and spacing of various radar sensors, including the radar sensor 280, emulated target locations and dimensions, drive scenarios, and the like.

In various embodiments, the processing unit 240 may include one or more computer processors, digital signal processors (DSP), field-programmable gate arrays (FPGAs), application specific integrated circuits (ASICs), or combinations thereof, using any combination of hardware, software, firmware, hard-wired logic circuits, or combinations thereof. The processing unit 240 may include its own processing memory (e.g., memory 245) for storing computer readable code (e.g., software, software modules) that enables performance of the various functions described herein. For example, the memory may store software instructions/computer readable code executable by the processing unit 240 (e.g., computer processor) for performing some or all aspects of methods described herein, including various operations of the methods described below with reference to FIGS. 4 and 8. That is, execution of the instructions/computer readable code generally causes the processing unit 240 to emulate echo signals reflected from emulated radar targets in response to the received radar signals transmitted by the radar sensor 280. References to the processing unit 240 may be interpreted to include one or more processing cores, as in a multi-core processor. The processing unit 240 may also refer to a collection of processors within a single computer system or distributed among multiple computer systems, as well as a collection or network of computing devices each including a processor or processors. Programs have software instructions performed by one or multiple processors that may be within the same computing device or which may be distributed across multiple computing devices.

The processing memory (e.g., memory 245), as well as other memories and databases (e.g., memory 245 and database 255), as described herein may be random-access memory (RAM), read-only memory (ROM), flash memory, electrically programmable read-only memory (EPROM), electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory storage media (e.g., as compared to transitory propagating signals). Memories may be volatile or non-volatile, secure and/or encrypted, unsecure and/or unencrypted, without departing from the scope of the present teachings. The memory 245 and the database 155 are representative of one or more memories and databases, including the processing memory as indicated above, as well as multiple memories and databases, including distributed and networked memories and databases.

Figure 3:
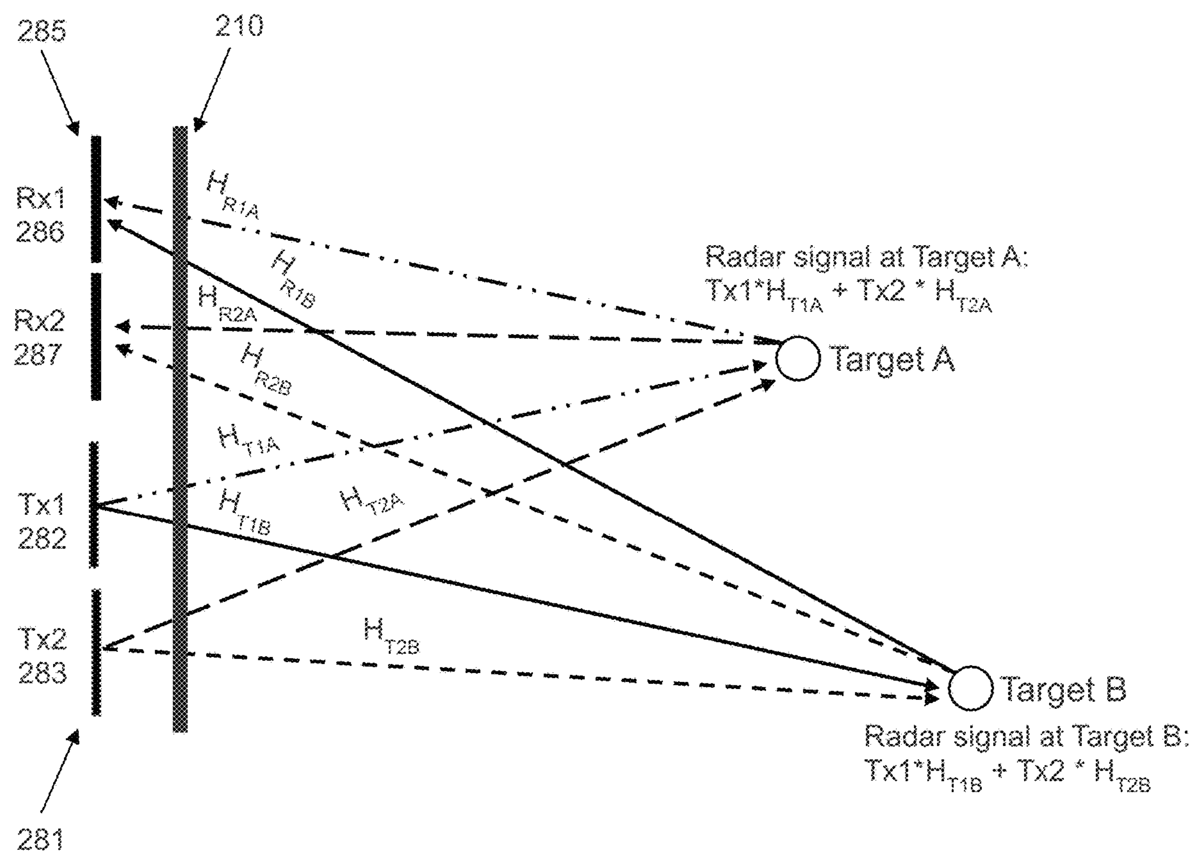
FIG. 3 is a simplified schematic diagram depicting direct emulation of echo signals reflected from emulated targets during automotive radar testing, according to a representative embodiment.

FIG. 3 is a simplified schematic diagram depicting direct emulation of echo signals reflected from emulated targets during automotive radar testing, according to a representative embodiment, using the radar target emulation system 200 of FIG. 2, for example.

Referring to FIG. 3, the transmitter 281 of the illustrative radar sensor 280 includes the first transmit channel 282 and the second transmit channel 283, and the receiver 285 of the radar sensor 280 includes the first receive channel 286 and the second receive channel 287, as discussed above. It is understood that, for over the air communications, the first and second transmit channels 282 and 283 are connected the first and second transmit antenna elements 292 and 293 (not shown in FIG. 3), respectively, and the first and second receive channels 286 and 287 are connected the first and second receive antenna elements 296 and 297 (not shown in FIG. 3), respectively. As discussed above, in the case of a wired connection between the radar sensor 280 and the radar target emulation system 200, the transmit and receive antennas would be effectively bypassed. FIG. 3 further shows an illustrative probe array antenna 210 of the radar target emulation system 200, which would receive radar signals and send emulated echo signals in the case of wireless connection. Again, the probe array antenna 210 would be effectively bypassed for wired communications.

Target A and Target B are illustrative, spatially separated, emulated radar targets represented by points. In the depicted example, the first transmit channel 282 (Tx1) sends a radar signal to Targets A and B, where the radar signal is indicated by transfer function $H_{Tx1A}$ to Target A and by transfer function $H_{Tx1B}$ to Target B. The transfer functions $H_{Tx1A}$ and $H_{Tx1B}$ represent the paths of the radar signal from the first transmit channel 282 to the Targets A and B. The transfer functions discussed herein, including the transfer functions $H_{Tx1A}$ and $H_{Tx1B}$, may be determined using known techniques that account for factors such as path loss, phase shifts due to distance and modulation by radar cross sections (RCSs) of the Targets A and B, for example, as would be apparent to one of ordinary skill in the relevant art. More complex techniques include ray-tracing, for example, also apparent to one of ordinary skill in the relevant art. The second transmit channel 283 (Tx2) sends the radar signal to Targets A and B, indicated by transfer function $H_{Tx1A}$ to Target A and by transfer function $H_{Tx2B}$ to Target B. The transfer functions $H_{Tx2A}$ and $H_{Tx1B}$ represent the paths the radar signal from the second transmit channel 283 to the Targets A and B. The first and second emulator receive channels 232 and 233 of the radar target emulation system 200 receive the first and second radar signals from the first and second transmit channels 282 and 283, and provide them to the processing unit 240, as discussed above.

The processing unit 240 calculates the emulated echo signals for each of Target A and Target B. The emulated echo signals may represent a shape of non-point target, which includes the Targets A and B as discussed below, in the azimuth and/or elevation directions, according to the embodiments herein. A first emulated signal representing the signal from the Tx1 and Tx2 at Target A is Tx1*$H_{T1A}$+Tx2*$H_{T2A}$, and a second emulated signal representing the signal from Tx1 and Tx2 at Target B is Tx1*$H_{T1B}$+Tx2*$H_{T2B}$. The processing unit 240 may apply far-field to near-field transfer functions to translate the far-field patterns from Targets A and B to near-field patterns for the first and second receive channels 286 and 287 when wireless connections are used. The probe array antenna 210 sends the emulated echo signals to the radar sensor 280. That is, in the depicted example, the probe array antenna 210 sends a first emulated echo signal, indicated by transfer function $H_{Rx1A}$, to the first receive channel 286 (Rx1) from Target A, and a second emulated echo signal, indicated by transfer function $H_{Rx2A}$, to the second receive channel 287 (Rx2) from Target A. The transfer functions $H_{Rx1A}$ and $H_{Rx1B}$ represent the paths of the first and second emulated echo signals from the Targets A and B to the first receive channel 286. The probe array antenna 210 also sends a third emulated echo signal, indicated by transfer function $H_{Rx1B}$, to the first receive channel 286 (Rx1) from Target B, and a fourth emulated echo signal, indicated by transfer function $H_{Rx2B}$, to the second receive channel 287 (Rx2) from Target B. The transfer functions $H_{Rx2A}$ and $H_{Rx2B}$ represent the paths of the third and fourth emulated echo signals from the Targets A and B to the second receive channel 287.

Accordingly, the combined target echo signal received at the first receive channel 286 may be represented by Equation (1), where $RCS_A$ is the radar cross section of Target A and $RCS_B$ is the radar cross section of Target B:

$$[H_{Rx1A}*RCS_A*(Tx1*H_{Tx1A}+Tx2*H_{Tx2A})]+[H_{Rx1B}*RCS_B*(Tx1*H_{Tx1B}+Tx2*H_{Tx2B})] \quad (1)$$

Similarly, the combined target echo signal received at the second receive channel 287 may be represented by Equation (2):

$$[H_{Rx2A}*RCS_A*(Tx1*H_{Tx1A}+Tx2*H_{Tx2A})]+[H_{Rx2B}*RCS_B*(Tx1*H_{Tx1B}+Tx2*H_{Tx2B})] \quad (2)$$

Generally, a radar sensor (e.g., radar sensor 280) derives target positioning by a combination of a return delay of an echo signal, responsive to a transmitted radar signal, and a measured angle of arrival (AoA) between the returned echo signal and a center point of an antenna array (e.g., phased array antenna 290). The return delay may be directly measured or the return delay may be implied, as in the case of frequency-modulated continuous-wave (FMCW) radar. The AoA may be determined by measuring the relative phases of the echo signal as received at receive elements (e.g., first and second receive channels 286 and 287 of receiver 285) via the antenna array, as discussed below with reference to FIGS. 5A-5B. For example, it may be assumed that the antenna array is a simple one dimensional (1D) antenna array arranged in an azimuthal dimension, and that the emulated target is far away from the radar sensor, such that any differences between the AoAs of individual receive antenna elements corresponding to receive channels are negligible. Each receive channel effectively receives the same echo signal, time shifted by an amount equal to $(D_{Rx}/c)\sin\theta$, where θ is the angle off-axis of the emulated target relative to the antenna array, $D_{Rx}$ is the distance between receive antenna elements (e.g., first and second receive antenna elements 296 and 297) in the antenna array at the radar sensor, and c is the speed of light.

Direct synthesis computes the AoA information by first determining the radar signal as seen by emulated targets on a per target basis. This is done by determining the expected radar signal from each transmit channel (e.g., first transmit and second transmit channels 282 and 283 of the transmitter 281) at one emulated target (e.g., Target A), and superposing the radar signals from each transmit channel, as shown in FIG. 3. The return path is then determined from the emulated target to the receive antenna array. The AoA information is imparted by generating N copies of the emulated echo signal at the receive antenna array, where each copy is delayed relative to each other by $(D_{Rx}/c)\sin\theta$, as described above. The N copies of the emulated echo signal are then imparted onto the receive antenna array. The process is repeated above for each remaining emulated target (e.g., Target B). The superposition of the N receive signals may be computed digitally and summed prior to imparting onto the receive antenna array.

Figure 4:
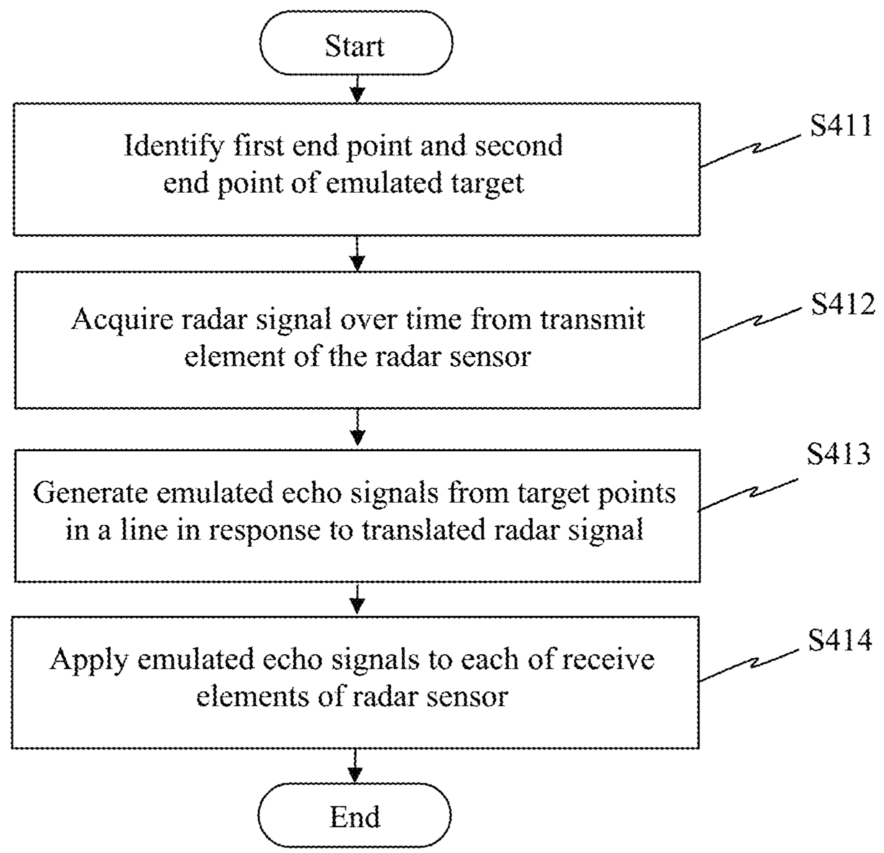
FIG. 4 is a simplified flow diagram depicting a method of emulating echo signals reflected from an emulated target during automotive radar testing, according to a representative embodiment.

FIG. 4 is a simplified flow diagram depicting a method of emulating echo signals reflected from an emulated target during automotive radar testing, according to a representative embodiment. The emulated echo signals are provided in response to radar signals transmitted by the automotive radar of a radar sensor (e.g., radar sensor 280) under test. In the depicted embodiment, the emulated echo signals represent the emulated target in an azimuth (horizontal) direction of a phased array antenna of the radar sensor. The various operations of FIG. 4 may be performed, for example, by a processing unit (e.g., processing unit 240) and a memory (e.g., memory 245) of a radar target emulation system (e.g., radar target emulation system 200), as described above.

Also, the radar sensor may include multiple transmit channels (e.g., first and second transmit channels 282 and 283) for sending the radar signals, as well as multiple receive channels (e.g., first and second receive channels 286 and 287) for ultimately receiving the emulated signals. For purposes of explanation, the emulation process of FIG. 4 is described with reference to one radar signal transmitted over time from one or more of the multiple transmit channels of the radar sensor. It is understood, however, that additional radar signals may be transmitted by different transmit channels at substantially the same time, and that these additional radar signals will be processed in substantially the same way as described herein.

Referring to FIG. 4, the method of emulating echo signals includes identifying a first end point and a second end point of the emulated target in block S411. The first and second end points represent end points of a line corresponding to a shape of the emulated target in an azimuth direction. The first and second end points may be represented by x-y coordinates in a two-dimensional (2D) coordinate system implemented by the processing unit. Alternatively, the first and second end points may be represented by x-y-z coordinates in a three-dimensional (3D) coordinate system, without departing from the scope of the present teachings. The shape of the emulated target, as well as other parameters, such as the locations of the first and second end points and respective angles and distances from the radar sensor, may be determined for a standalone obstacle or as part of a more complex drive scenario.

In block S412, a radar signal is acquired over time from one or more transmit elements of the radar sensor. The radar signal is acquired over wireless or wired connections by one or more emulator receive channels (e.g., first and second emulator receive channels 232 and 233), as discussed above. The radar sensor transmits the radar signal according to an integration period, which is a predetermined time period during which the radar signal is frequency chirped over a predetermined frequency range (e.g., about 76 GHz to about 77 GHz) for a single radar reading. In an embodiment, the integration period includes frequency chirping back and forth over the predetermined frequency range one or more times, which enables averaging of measured attributes of the acquired radar signal over the integration period (averaging period). Thus, the integration period comprises a set of frequency chirps over the predetermined frequency range. To the extent that the radar sensor and the radar target emulation system are connected wirelessly, the acquired radar signal may be translated from a near-field antenna pattern to a far-field antenna pattern, as would be within the purview of one of ordinary skill in the art.

In block S413, emulated echo signals are generated in response to the radar signal. The emulated echo signals correspond to multiple target points on the emulated target, including first and second end points and interpolated reference points on a line formed by the first and second end points. The multiple target points include the first end point, the second end point, and one or more reference points located on the line connecting the first end point and the second end point. The one or more reference points likewise may be represented by x-y coordinates in the 2D coordinate system implemented by the processing unit, or by x-y-z coordinates in the 3D coordinate system, as discussed above with regard to the first and second end points. The number and positions of the reference points on the line connecting the first and second end points may vary, without departing from the scope of the present teachings, based on criteria such as distance between the first and second end points, and processor speed and availability. For example, the reference points may be separated from one another by less than the spatial resolution of the radar sensor, in which case the radar sensor is unable to discern that the physically continuous emulated target is comprised of distinct points.

The emulated echo signals are generated by repeatedly identifying descriptive attributes respectively corresponding to each of the target points during an integration period of the radar sensor. The descriptive attributes corresponding to each of the reference points are identified by interpolating between the same corresponding descriptive attributes of the first and second end points using the respective locations of the reference points. The descriptive attributes corresponding to each of the target points may include at least one of distance, velocity, reflectivity or AoA in relation to a corresponding receive element of multiple receive elements of the radar sensor. To the extent that the radar sensor and the radar target emulation system are connected wirelessly, the emulated echo signals may be translated from a far-field antenna pattern to a near-field antenna pattern, as would be within the purview of one of ordinary skill in the art.

In block S414, the emulated echo signals are applied to each of the receive elements of the radar sensor, respectively, during the integration period. The emulated echo signals represent the emulated target from the first end point to the second end point. The radar sensor may then calculate a relative position of the emulated target using the descriptive attributes of the target points corresponding to the emulated echo signals pursuant to the automotive testing. In an embodiment, the method may further include weighting the emulated echo signals to be applied to the receive elements using magnitudes of the transfer function corresponding to reflectivity of the corresponding target points on the emulated target.

Figure 5A:
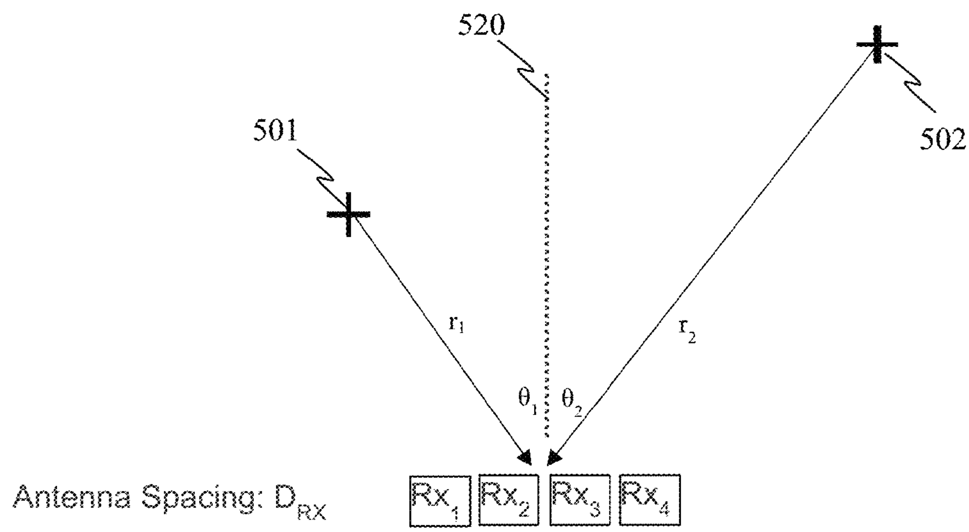
FIG. 5A is a simplified schematic diagram depicting point radar targets for emulating echo signals, according to a representative embodiment.
Figure 5B:
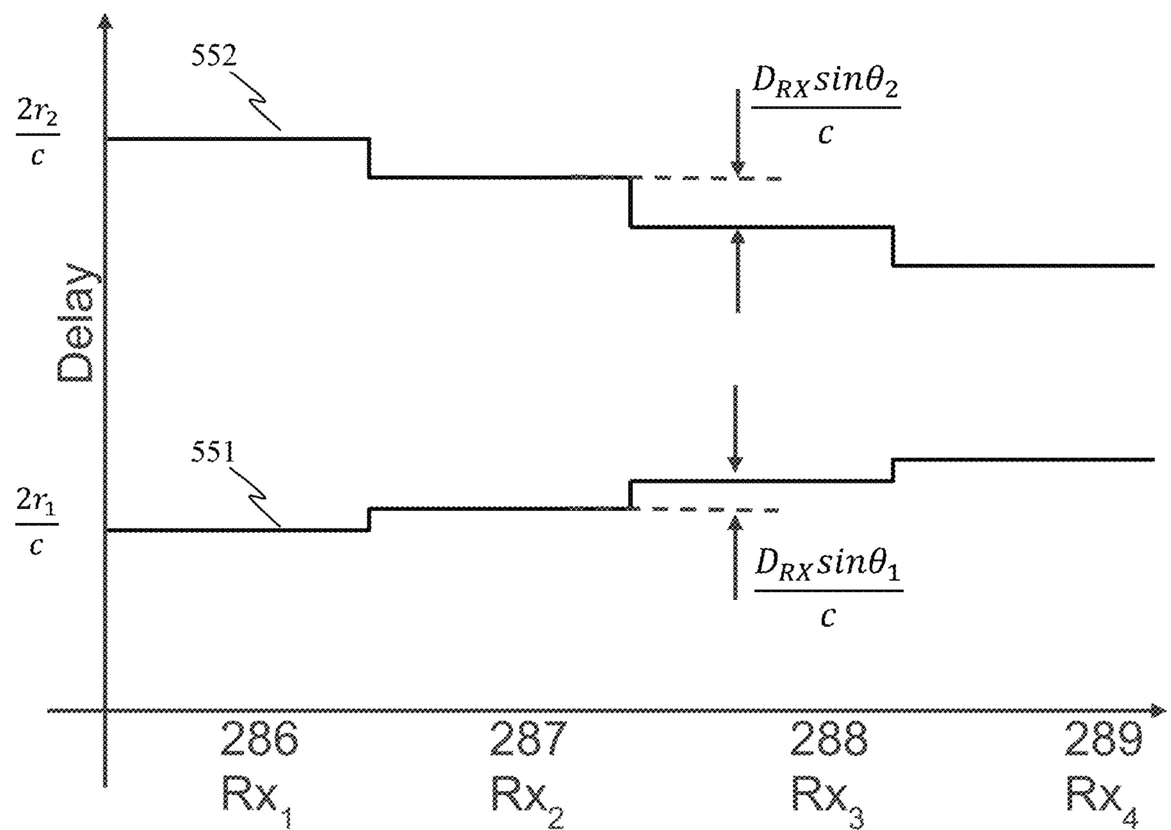
FIG. 5B is a graph showing delays of the emulated echo signals from the point radar targets with respect to multiple receive elements of a radar sensor, according to a representative embodiment.

FIG. 5A is a simplified schematic diagram depicting point radar targets for emulating echo signals, according to a representative embodiment, and FIG. 5B is a graph showing delays of the emulated echo signals from the point radar targets with respect to multiple receive elements of a radar sensor, according to a representative embodiment. The emulated echo signals may be provided by the radar target emulation system 200 of FIG. 2, for example.

Referring to FIG. 5A, emulated point radar targets are represented by a first end point (first point target) 501 and a second end point (second point target) 502. The receiver 285 of the radar sensor includes the first receive channel 286 ($Rx_1$) and the second receive channel 287 ($Rx_2$), as discussed above, as well as a third receive channel 288 ($Rx_3$) and a fourth receive channel 289 ($Rx_4$). The first receive channel 286, the second receive channel 287 ($Rx_2$), the third receive channel 288, and the fourth receive channel 289 ($Rx_4$) respectively connect to corresponding receive antenna elements, e.g., of a phased array antenna, which includes the first and second receive antenna elements 296 and 297 (not shown in FIG. 5A), discussed above. Adjacent ones of the receive antenna elements are separated by a spacing distance $D_{Rx}$, where the spacing distance $D_{Rx}$ may be half the wavelength of the center frequency of the radar signal, for example. Other values may be used for the spacing distance $D_{Rx}$, without departing from the scope of the present teachings, where there generally is a tradeoff between the spacing distance and a range of ambiguity (e.g., increased spacing distance generally results in better angular resolution but introduces more ambiguity, particularly for targets with large off-axis angles). The first end point 501 is at a first distance $r_1$ and a first AoA $\theta_1$ from a center point (or other reference point) 520 of the phased array antenna, for example, indicated by a dashed line, and the second end point 502 is at a second distance $r_2$ and a second AoA $\theta_2$ from the center point of the phased array antenna.

The first to fourth receive channels 286 to 289 have corresponding delay times with respect to the first and second end points 501 and 502. Each of the delay times is the roundtrip delay in receiving the emulated echo signals after the radar signal is initially transmitted by the transmitter 281 (not shown in FIG. 5A) due to the ranges to the first and second end points 501 and 502, respectively. These delay times may be determined based on the first distance $r_1$ and the first AoA $\theta_1$ from the center point of the phased array antenna to the first end point 501, and the second distance $r_2$ and the second AoA $\theta_2$ from the center point of the phased array antenna 290 to the second end point 502, adjusted by the spacing distance $D_{Rx}$, as shown in FIG. 5B, for example. In other words, the delay time with respect to each of the first and second end points 501 and 502 is a function of target distance and target angle.

In FIG. 5B, the horizontal axis shows the first to fourth receive channels 286 to 289, and the vertical axis shows the roundtrip delay associated with each of the first to fourth receive channels 286 to 289. Referring to trace 551, the receive antenna element connected to the first receive channel 286 is closest to the first end point 501, and therefore provides the shortest delay time, indicated by $2r_1/c$, where c is the speed of light. Thereafter, the receive antenna elements connected to the second to fourth receive channels 287 to 289 are progressively further away from the first end point 501, so the associated roundtrip delays are incrementally longer by $D_{Rx}(\sin \theta_1)/c$, again where c is the speed of light. Referring to trace 552, the receive antenna element connected to the first receive channel 286 is now furthest from the second end point 502, and therefore provides the longest delay time, indicated by $2r_2/c$. Thereafter, the receive antenna elements connected to the second to fourth receive channels 287 to 289 are progressively closer to the second end point 502, so the associated roundtrip delays are incrementally shorter by $D_{Rx}(\sin \theta_2)/c$. So, as discussed above, the return paths may be computed from the first and second end points 501 and 502 to the phased array antenna according to the delay times as shown in FIG. 5B. The AoA information is imparted by generating four copies of each of the emulated echo signals at the phased array antenna, where each copy is adjusted for delay relative to another copy by $D_{Rx}(\sin \theta_1)/c$ for the emulated echo signal from the first end point 501 and by $D_{Rx}(\sin \theta_2)/c$ for the emulated echo signal from the second end point 502. These four copies of each of the emulated echo signals are summed and then imparted onto the phased array antenna.

Figure 6A:
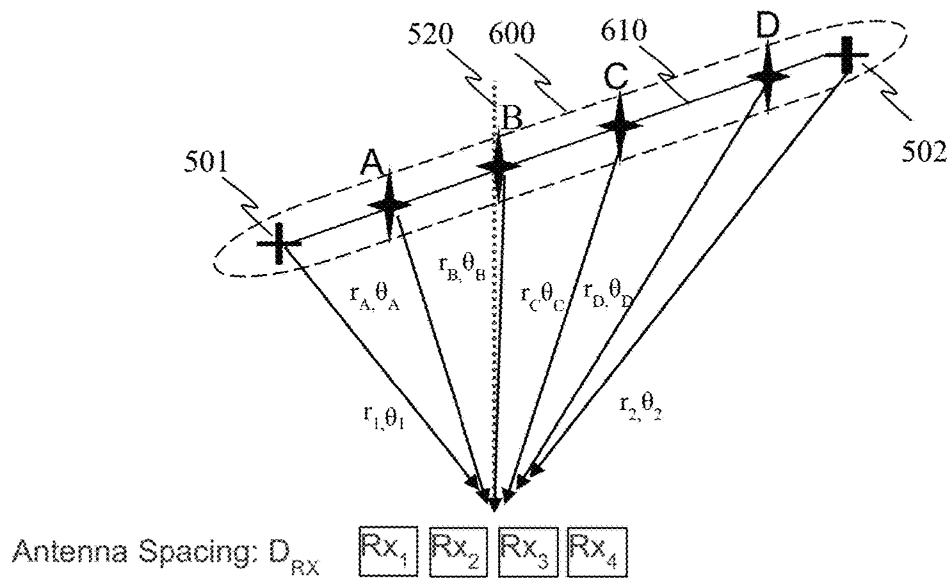
FIG. 6A is a simplified schematic diagram depicting an elongated emulated target for emulating echo signals including the reference points, according to a representative embodiment.
Figure 6B:
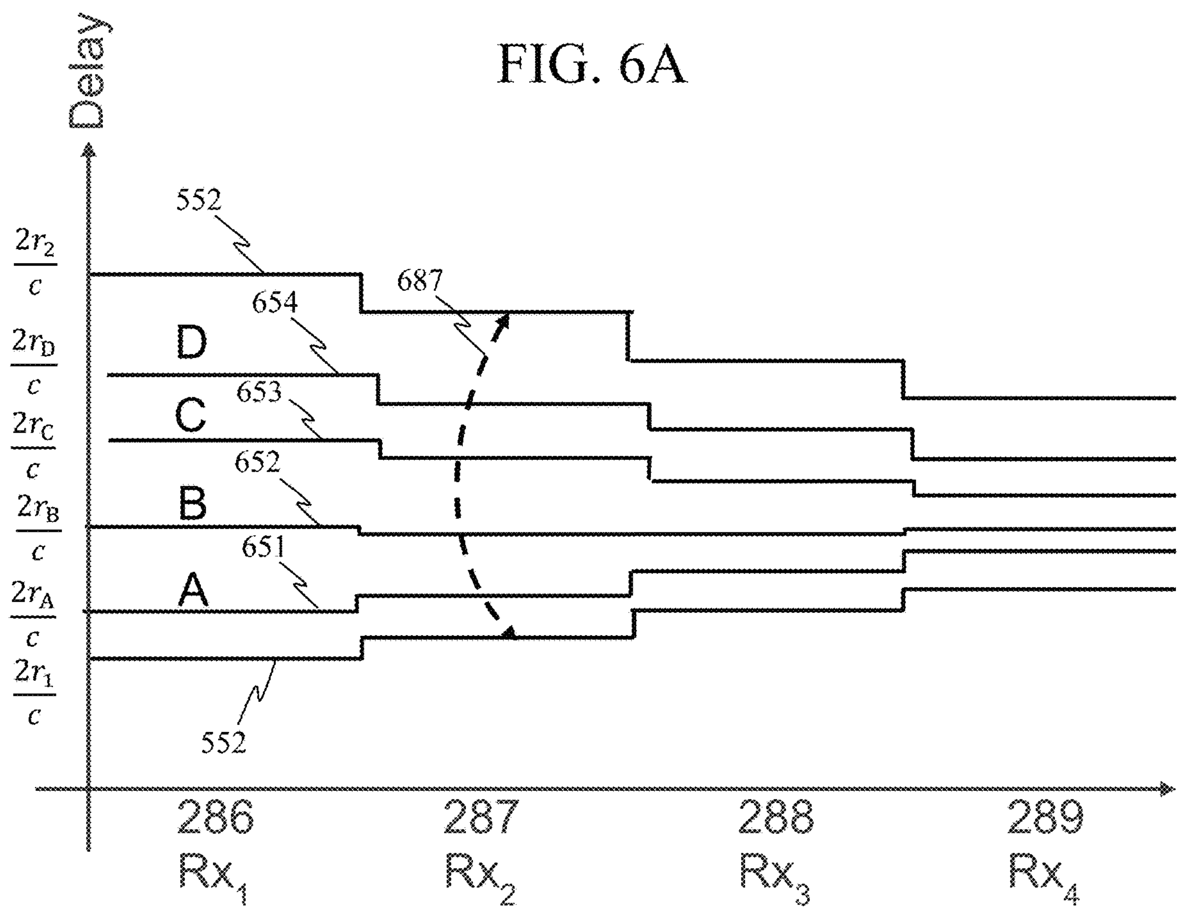
FIG. 6B is a graph showing delays of the emulated echo signals from the elongated target with respect to multiple receive elements of a radar sensor, according to a representative embodiment.

According to various embodiments, the first and second end points 501 and 502 define an elongated emulated target that includes reference points located on a line joining the first and second end points 501 and 502, where the same delay adjustment discussed above is performed for each of these reference points, as well. FIG. 6A is a simplified schematic diagram depicting an elongated emulated target for emulating echo signals including the reference points, according to a representative embodiment, and FIG. 6B is a graph showing delays of the emulated echo signals from the elongated target with respect to multiple receive channels of a radar sensor, according to a representative embodiment. The emulated echo signals may be provided by the radar target emulation system 200 of FIG. 2, for example.

Referring to FIG. 6A, emulated target 600 is represented by the first end point 501, the second end point 502 joined by the line 610, as well as a first reference point A, a second reference point B, a third reference point C, and a fourth reference point D located on the line 610. The number and separation of the first to fourth reference points A-D are generally determined so that the radar sensor blends them together as it integrates the received signals, for example, when the spacing between the first to fourth reference points A-D is less than the resolution of the radar sensor, as discussed above with reference to block S413 in FIG. 4. In the depicted example, the emulated target 600 is shown as an elongated target for purposes of explanation, although the emulated target 600 may be any shape that would benefit from representation by one or more lines (e.g. as opposed to points) in the emulation process. The first and second end points 501 and 502, and the first to fourth reference points A to D may be collectively referred to as "target points."

Again, the first receive channel 286 ($Rx_1$), the second receive channel 287 ($Rx_2$), the third receive channel 288 ($Rx_3$), and the fourth receive channel 289 ($Rx_4$) respectively connect to corresponding receive antenna elements, e.g., in a phased array antenna, which includes the receive antenna elements 296 and 297 (not shown in FIG. 6A). Adjacent ones of the receive antenna elements are separated by a spacing distance $D_{Rx}$. As discussed above, the first end point 501 is at a first distance $r_1$ and a first AoA $\theta_1$ from the center point 520 of the phased array antenna, and the second end point 502 is at a second distance $r_2$ and a second AoA $\theta_2$ from the center point 520 of the phased array antenna. In addition, the first reference point A is at a first reference distance $r_A$ and a first reference AoA $\theta_A$, the second reference point B is at a second reference distance $r_B$ and a second reference AoA $\theta_B$, the third reference point C is at a third reference distance $r_C$ and a third reference AoA $\theta_C$, and the fourth reference point D is at a fourth reference distance $r_D$ and a fourth reference AoA $\theta_D$ from the center point 520. The reference distances and AoAs may be individually calculated for the reference points A to D, or they may be interpolated using the distance and AoAs of the first and second end points 501 and 502, for example.

The first to fourth receive channels 286 to 289 have corresponding delay times with respect to the first and second end points 501 and 502, as well as the first to fourth reference points A to D. These delay times may be determined based on the respective distances and AoAs from the center point 520 of the phased array antenna to the first and second end points 501 and 502, and the first to fourth reference points A to D, respectively, adjusted by the spacing distance $D_{Rx}$, as shown in FIG. 6B, for example.

In FIG. 6B, the horizontal axis shows the first to fourth receive channels 286 to 289, and the vertical axis shows the roundtrip delay associated with each of the first to fourth receive channels 286 to 289. As discussed above, referring to trace 551, the receive antenna element connected to the first receive channel 286 is closest to the first end point 501, and therefore provides the shortest delay time, indicated by $2r_1/c$. Thereafter, the receive antenna elements connected to the second to fourth receive channels 287 to 289 are progressively further away from the first end point 501, so the associated roundtrip delays are incrementally longer by $D_{Rx}(\sin\theta_1)/c$. Referring to trace 552, the receive antenna element connected to the first receive channel 286 is now furthest from the second end point 502, and therefore the first receive channel 286 has the longest delay time, indicated by $2r_2/c$. Thereafter, the receive antenna elements connected to the second to fourth receive channels 287 to 289 are progressively closer to the second end point 502, so the associated roundtrip delays are incrementally shorter by $D_{Rx}(\sin\theta_2)/c$.

In the same manner, trace 651 shows delay times associated with each of the first to fourth receive channels 286 to 289 for the first reference point A, where the receive antenna element connected to the first receive channel 286 is closest to the first reference point A, and therefore first receive channel 286 has the shortest delay time, indicated by $2r_A/c$, and the second to fourth receive channels 287 to 289 have associated roundtrip delays that are incrementally longer by $D_{Rx}(\sin\theta_A)/c$. Likewise, trace 652 shows delay times for the second reference point B, although the receive antenna elements connected to the second and third receive channels 287 and 288 are the same distance from the second reference point B and closer (less delay) than the receive antenna elements connected to the first and fourth receive channels 286 and 289. Therefore, the associated roundtrip delay at the second receive channel 287 is shorter by $D_{Rx}(\sin\theta_B)/c$ than at the first receive channel 286, and the associated roundtrip delay at the fourth receive channel 289 is longer by $D_{Rx}(\sin\theta_B)/c$ than at the third receive channel 288. Trace 653 shows delay times for the third reference point C, and trace 654 shows delay for the fourth reference point D, where the delay times are incrementally shorter from the first receive channel 286 to the fourth receive channel 289.

In order to emulate the elongated emulated target 600, emulated echo signals are generated by repeatedly identifying descriptive attributes respectively corresponding to each of the target points during an integration period of the radar sensor. The descriptive attributes may include at least one of distance (or delay) between the target points and the phased array antenna, velocity of the target points, reflectivity (or gain) of the target points, or AoA in relation to the phased array antenna. The descriptive attributes corresponding to each of the first to fourth reference points A to D may be identified by interpolating between the same corresponding descriptive attributes of the first and second end points 501 and 502 using the respective locations of the first to fourth reference points A to D.

So, for example, the delays associated with the target points may be modulated (dithered) over the length of the line 610, beginning with the set of delays associated with the first end point 501, over the sets of delays respectively associated with the first to fourth reference points A to D, to the set of delays associated with the second end point 502, and then back over the sets of delays respectively associated with the first to fourth reference points A to D in reverse direction, to the set of delays associated with the first end point 501. This modulation may be repeated one or more times during the integration period. Repeating the modulation enables averaging of the delay values at each of the target points. Since the modulation is performed during a single integration period of the radar signal, the radar sensor 280 interprets the return echo signal as a continuum from the first end point 501 to the second end point 502. That is, because the AoA is directly related to the relative time delay given by $D_{Rx}(\sin\theta)/c$, modulating the delays over the integration period of the radar signal results in the first and second end points 501 and 502 and the first to fourth reference points A to D appearing to be a line in the azimuthal direction. Referring again to FIG. 6B, arrow 687 depicts a representative continuum of curves comprising a continuum of points, each having its own delay curve, representing the target points along the line 610 as seen at the second receive channel 286. Notably, the number of reference points is assumed to be four for purposes of illustration and ease of explanation. However, in order for the spatial separation between the reference points to be less than the resolution of the radar, the number of reference points may be considerably greater than four.

As an example, if the radar sensor 280 is operating at a center frequency of 76.5 GHz, the wavelength of the radar signal is 3.9 mm. Assuming that the receive antenna elements (e.g., first and second receive antenna elements 296 and 297) of the phased array antenna are spaced apart by a half wavelength, the spacing distance $D_{Rx}$ is 1.95 mm. A point target at 30 degrees offset would then require relative time delays of sin(30°)*(1.95 mm/c)=3.27 ps between each of the receive antenna elements, so there will be 9.81 ps of total delay across the four receive antenna elements of the phased array antenna. Modulating the time delays between 3.0 ps and 3.6 ps over the integration period of the radar sensor results in an effective AoA spanning from 27.3 degrees to 33.4 degrees, creating the appearance of the emulated target 600 between these angles. This modulation may be uniform across the integration period of the radar sensor 280, or may be weighted to provide an emulated target 600 having a non-uniform radar cross section (RCS) as a function of angle.

Elevation information is also available to a radar sensor, e.g., using a 1D receive antenna array with high-gain and a radar signal with adequate bandwidth. The transmit antenna elements of the radar sensor may be designed such that the radiation pattern is compressed in the vertical dimension. This is because there is little information to be gleaned by sending the radar signal into the sky or into the ground directly in front of the automobile. The compressed radiation pattern may be obtained using a set of stacked transmit antenna elements in the radar antenna array separated by a fractional wavelength, typically one-half the wavelength of the center frequency of the radar signal. When the separation of the antenna elements is fixed at an ideal separation with respect to the wavelength, the radiation pattern is maximal in a plane orthogonal to the transmit antenna element stack (e.g., a horizontal plane). However, when the separation of the transmit antenna elements deviates from the ideal separation, for example when the wavelength varies, the radiation pattern tilts up or down, depending on whether the resulting separation with respect to the wavelength is less than or greater than the ideal value.

According to various embodiments, the tilting of the radiation pattern may be used to infer elevation information for emulating a radar target. For example, FMCW radar operates by emitting a set of chirps that ramp linearly in frequency over a specified bandwidth during a predetermined chirp period. For example, the bandwidth may be 76 GHz to 77 GHz, and the duration of a frequency chirp may be 30 μs, for example. Also, in various embodiments, there may be 128 or 256 frequency chirps in an integration period, for example. However, other bandwidths and chirp durations, and other chirps per integration period, may be incorporated without departing from the scope of the present teachings. There is a delay in the return echo signal due to the range of the emulated target that reflects the FMCW radar signal. The frequency of the return echo signal may be compared to the instantaneous transmit frequency of the FMCW radar signal, and the difference frequency may be used to infer the range of the emulated target.

Because the radar signal chirps from 76 GHz to 77 GHz, for example, the corresponding wavelength of the radar signal also varies. The transmit antenna elements used to emit the radar signal are physically fixed, so the relative electrical separation of the transmit antenna elements measured in units of wavelength varies as the radar signal chirps from the one frequency to the next over the specified bandwidth. This effective variation in separation results in a modulation of the emitted radiation pattern as a function of the instantaneous transmit frequency. For example, as the frequency chirp ramps from 76 to 77 GHz, the emitted radiation pattern may start aimed below horizontal, move through the horizontal plane and end aimed above horizontal as the frequency increases, resulting in a expanded vertical field of view. This variation in the radiation pattern results in the intensity of the return echo signal varying during the frequency sweep as a function of the RCS of the emulated target versus the elevation with respect to the horizontal.

Figure 7:
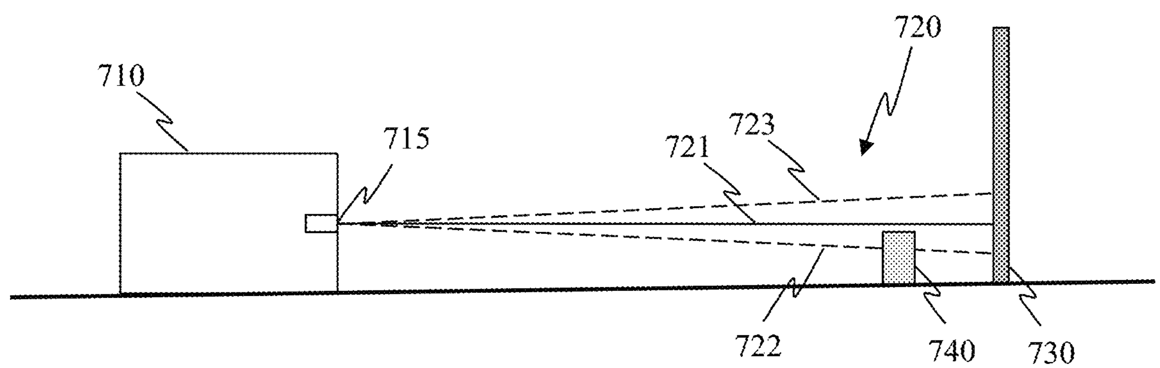
FIG. 7 is a plan view of an automotive radar sensor illuminating a vertically oriented target.

FIG. 7 is a plan view of an automotive radar sensor illuminating a vertically oriented target. Referring to FIG. 7, an automobile 710 includes a radar sensor 715 that transmits radar signals in a forward direction relative to movement of the automobile 710. The radar sensor 715 transmits a radar signal that varies in wavelength over a predetermined range (e.g., corresponding to the changing frequencies during the chirp period), and thus has a vertical field of view 720. The vertical field of view 720 includes a horizontal component 721 at the ideal separation of the antenna elements of the radar sensor 715, a lower limit 722 at a maximum wavelength (e.g., minimum chirp frequency) of the radar signal, and an upper limit 723 at a minimum wavelength (e.g., maximum chirp frequency) of the radar signal.

A first representative target 730 (e.g., a telephone pole) has an RCS that extends through the entire vertical field of view 720, while a second representative target 740 (e.g., a fire hydrant) has an RCS that extends through only a lower portion of the vertical field of view 720. Since the first representative target 730 spans the entire vertical field of view 720, it returns a signal that is consistent over the chirp period. Since the second representative target 740 spans only the lower portion of the vertical field of view 720, it returns a signal that is non-uniform over the chirp period. For example, if the radar beam is pointed down at 76 GHz and up at 77 GHz, then the second representative target 740 will have a stronger signal at 76 GHz than at 77 GHz. That is, for radar targets that span only a portion of the vertical field of view 720, the amplitude of the returned echo signal varies as a function of the instantaneous frequency and vertical position. So, in the depicted example, the second representative target 740 has an RCS only below the horizontal component 721 and therefore returns a stronger echo signal at the beginning of the chirp period than at the end as the beam is aimed towards the second representative target 740 at the beginning of the chirp period and is aimed away from the second representative target 740 at the end of the chirp period. In contrast, if the RCS of the second representative target 740 were only above the horizontal component 721, it would return a stronger echo signal at the end of the chirp period than at the beginning. Accordingly, the vertical position of a radar target generally speaking may be emulated by modulating the signal strength of an emulated echo signal as a function of the instantaneous frequency of the radar signal.

Figure 8:
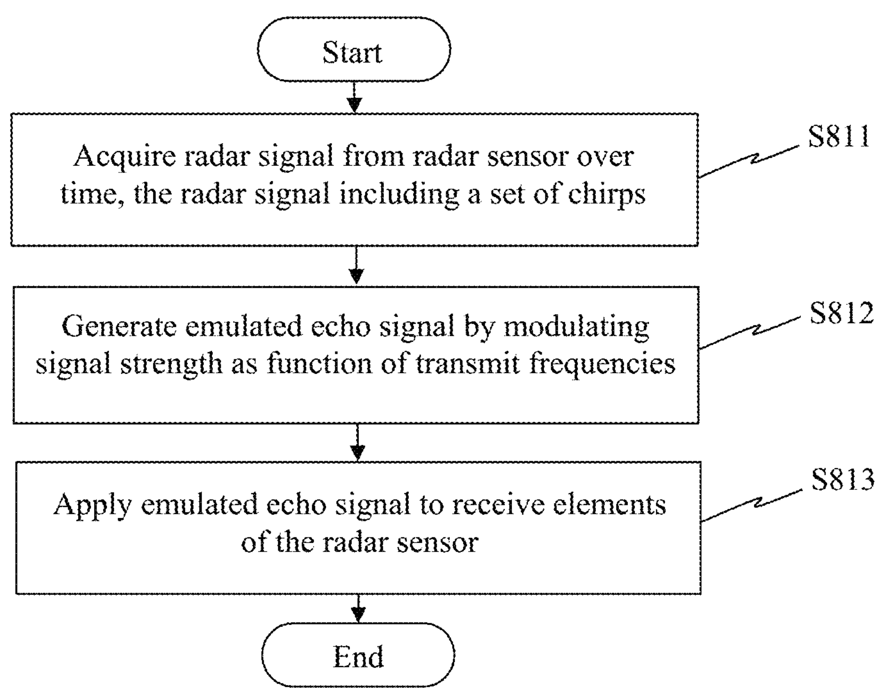
FIG. 8 is a simplified flow diagram depicting a method of emulating echo signals reflected from an emulated target during automotive radar testing, according to a representative embodiment.

FIG. 8 is a simplified flow diagram depicting a method of emulating echo signals reflected from an emulated target during automotive radar testing, according to a representative embodiment. The emulated echo signals are provided in response to radar signals transmitted by the automotive radar of a radar sensor (e.g., radar sensor 280) under test. In the depicted embodiment, the emulated echo signals represent the emulated target in an elevation (vertical) direction of a phased array antenna of the radar sensor. The various operations of FIG. 8 may be performed, for example, by a processing unit (e.g., processing unit 240) and a memory (e.g., memory 245) of a radar target emulation system (e.g., radar target emulation system 200), as described above. Also, the various operations of FIG. 8 may be performed together with or independently of the various operations of FIG. 4, discussed above.

Also, the radar sensor may include multiple transmit channels (e.g., first and second transmit channels 282 and 283) for sending the radar signals, as well as multiple receive channels (e.g., first and second receive channels 286 and 287) for ultimately receiving the emulated signals. For purposes of explanation, the emulation process of FIG. 8 is described with reference to one radar signal transmitted over time from one or more transmit channels of the radar sensor. It is understood, however, that additional radar signals may be transmitted from different transmit channels at substantially the same time, and that these additional radar signals will be processed in substantially the same way as described herein.

Referring to FIG. 8, the method of emulating echo signals includes acquiring a radar signal over time from transmit channels of the radar sensor at block S811. The radar signal is acquired over wireless or wired connections by one or more emulator receive channels (e.g., first and second emulator receive channels 232 and 233), as discussed above. The radar signal may be an FMCW radar signal comprising a set of frequency chirps having respective transmit frequencies linearly ramped over a specified bandwidth during a predetermined chirp period of the radar sensor. The radiation pattern of the radar sensor varies vertically as a function of the transmit frequencies. For example, assuming the radar signal is frequency chirped over a frequency bandwidth from 76 GHz to 77 GHz with a positive slope chirp, the radiation pattern sweeps from below the horizontal (e.g., below the horizontal component 721) to above the horizontal as the frequency of the radar increases over the chirp period. The vertical field of view (e.g., vertical field of view 720) of the radar sensor corresponds to the lowest and highest frequencies of the radar signal over the chirp period. To the extent that the radar sensor and the radar target emulation system are connected wirelessly, the acquired radar signal may be translated from a near-field antenna pattern to a far-field antenna pattern, as would be within the purview of one of ordinary skill in the art.

In block S812, an emulated echo signal is generated in response to the translated radar by modulating signal strength as a function of the transmit frequencies. That is, the emulated signal strength is adjusted to indicate the presence of the emulated target at different vertical positions relative to the horizontal component of the transmitted radar signal. For example, the signal strength of the emulated echo signal may be set higher at a particular vertical angle to indicate the presence of a portion of the emulated target at that vertical angle. Since the radar signal sweeps through a set of vertical angles during the chirp period by changing the transmit frequencies, the particular vertical angle at which the portion of the emulated target is positioned may be identified based on the frequency corresponding to that vertical angle.

In an embodiment, modulating the signal strength of the emulated echo signal includes filtering the radar signal using a filter that has a frequency response across the specified bandwidth. The frequency response of the filter may be controlled to vary in response to the transmit frequencies to indicate a desired vertical position of the emulated target, or filters with fixed frequency responses to certain frequencies may be selectively incorporated to indicate a desired vertical position of the emulated target. For example, to indicate the presence of the emulated target at a height below the horizontal component, a filter may be used that provides band pass at a transmit frequency that causes the radiation pattern to tilt downward, below the horizontal component.

Generally, the radiation pattern of the radar signal may sweep from below the horizontal component to above the horizontal component as the transmit frequencies increase. Therefore, when a centroid (portion) of the emulated target is below the horizontal component, the frequency response of the filter provides higher magnitudes at lower frequencies of the transmit frequencies (e.g., below a center frequency), and when the centroid of the emulated target is above the horizontal component, the frequency response of the filter provides higher magnitudes at higher frequencies (e.g., above a center frequency). Likewise, the radiation pattern of the radar signal may sweep from above the horizontal component to below the horizontal component as the transmit frequencies increase. Therefore, when a centroid of the emulated target is above the horizontal component, the frequency response of the filter provides higher magnitudes at lower frequencies of the transmit frequencies, and when the centroid of the emulated target is below the horizontal component, the frequency response of the filter provides higher magnitudes at higher frequencies. In both examples, when the portion of the emulated target is at the horizontal component, the frequency response of the filter provides higher magnitudes at middle frequencies of the transmit frequencies as compared to the lower frequencies and the higher frequencies.

In another embodiment, modulating the signal strength of the emulated echo signal includes synchronizing the RCS of the radar target with the set of chirps from the radar signal, and adjusting variable gain of a receiver (e.g., receiver 235) acquiring the radar signal to modulate the signal strength (amplitude) of the emulated echo signal as a function of the instantaneous transmit frequencies. This effectively acts as a filter. The RCS may be synchronized with the set of chirps either by obtaining a synchronization signal from the radar sensor, or by observing an actual transmitted radar signal and determining the instant the chirp starts by measuring instantaneous frequency of the radar signal, for example. To the extent that the radar sensor and the radar target emulation system are connected wirelessly, the emulated echo signal may be translated from a far-field antenna pattern to a near-field antenna pattern, as would be within the purview of one of ordinary skill in the art.

In block S813, the emulated echo signal is applied to the receive channels of the radar sensor. The radar sensor calculates the vertical position of the emulated target using the modulated signal strength of the emulated echo signal. Notably, by combining the azimuthal and elevation techniques, the radar target emulation system is able to emulate accurately all types of radar targets, including point targets, linear targets, and areal targets.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of emulating echo signals reflections from an emulated target during radar testing, the method comprising:

identifying a first end point and a second end point of the emulated target;

acquiring a radar signal from a radar sensor, the radar sensor including a one or more transmit elements for sending the radar signals and a plurality of receive elements;

generating emulated echo signals, responsive to the acquired radar signal, corresponding to a plurality of target points on the emulated target, the plurality of target points including the first end point, the second end point, and reference points located on a line connecting the first end point and the second end point, by repeatedly identifying descriptive attributes respectively corresponding to each of the target points during an integration period of the radar sensor, wherein the descriptive attributes corresponding to each of the reference points are identified by interpolating between the corresponding descriptive attributes of the first and second end points; and applying the emulated echo signals to the receive elements of the radar sensor, respectively, during the integration period, wherein the emulated echo signals represent the emulated target from the first end point to the second end point, and wherein the radar sensor calculates a relative position of the emulated target using the descriptive attributes of the target points corresponding to the emulated echo signals.

2. The method of claim 1, wherein the descriptive attributes corresponding to each of the target points comprise at least one of distance, velocity, reflectivity and angle of arrival (AOA) in relation to a corresponding receive element of the plurality of receive elements.

3. The method of claim 1, wherein the radar signals are chirped over a predetermined frequency range during the integration period.

4. The method of claim 3, wherein the integration period is an averaging period for averaging the descriptive attributes respectively corresponding to each of the target points over a predetermined amount of time.

5. The method of claim 1, further comprising:

weighting the emulated echo signals using magnitudes of a transfer function corresponding to reflectivity of the corresponding target points on the emulated target.

6. The method of claim 1, wherein identifying descriptive attributes respectively corresponding to each of the target points results in delay curves corresponding to the target points indicating delay times associated with the plurality of receive elements of the radar sensor, respectively.

7. A target emulation system for testing a radar sensor having a plurality of radar transmit elements for providing a plurality of radar signals, and a plurality of radar receive elements for receiving a plurality of target echo signals responsive to the plurality of radar signals emulating reflections from an emulated target, defined at least in part by a first end point and a second end point, the system comprising:

one or more emulator receive elements for acquiring a radar signal from the radar sensor;

a processing unit, including a processor and a memory for storing computer readable code that, when executed by the processor, causes the processor to:

identify the first end point and the second end point of the emulated target; and generate emulated echo signals, responsive to the radar signals, corresponding to a plurality of target points on the emulated target, the plurality of target points including the first end point, the second end point, and reference points located on a line connecting the first end point and the second end point, by repeatedly identifying descriptive attributes respectively corresponding to each of the target points during an integration period of the radar sensor, wherein the descriptive attributes corresponding to each of the reference points are identified by interpolating between the corresponding descriptive attributes of the first and second end points; and a plurality of emulator transmit elements for applying the emulated echo signals to the receive elements of the radar sensor, respectively, during the integration period, wherein the emulated echo signals represent the emulated target from the first end point to the second end point, and wherein the radar sensor calculates a relative position of the emulated target using the descriptive attributes of the target points corresponding to the emulated echo signals.

8. The system of claim 7, wherein the radar sensor comprises a receive antenna array including a plurality of receive antenna elements separated by antenna spacing, the receive antenna elements respectively corresponding to the plurality of receive channels of the radar sensor; and wherein the receive antenna elements are different distances from each of the target points, such that the identifying descriptive attributes respectively corresponding to each of the target points results in delay curves corresponding to the target points indicating delay times associated with the receive antenna elements, respectively.

9. The system of claim 7, wherein at least one of the radar sensors comprises a receive antenna array including a plurality of receive antenna elements separated by antenna spacing, the receive antenna elements respectively corresponding to the plurality of receive channels of the radar sensor; and wherein the receive antenna elements are different distances from each of the target points, such that the identifying descriptive attributes respectively corresponding to each of the target points results in delay curves corresponding to the target points indicating delay times associated with the receive antenna elements, respectively.

10. The system of claim 9, wherein the descriptive attributes corresponding to each of the target points comprise at least one of distance, velocity, reflectivity and angle of arrival (AOA) in relation to a corresponding receive element of the plurality of receive elements.

* * * * *